United States Patent
Kraemer et al.

(10) Patent No.: US 11,188,379 B2
(45) Date of Patent: Nov. 30, 2021

(54) THERMAL CAPACITY OPTIMIZATION FOR MAXIMIZED SINGLE CORE PERFORMANCE

(71) Applicant: INTERNATIONAL BUSINESS MACHINES CORPORATION, Armonk, NY (US)

(72) Inventors: Marco Kraemer, Sindelfingen (DE); Matteo Michel, Chemnitz (DE); Carsten Otte, Stuttgart (DE); Christoph Raisch, Gerlingen (DE)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/137,643

(22) Filed: Sep. 21, 2018

(65) Prior Publication Data
US 2020/0097322 A1    Mar. 26, 2020

(51) Int. Cl.
*G06F 9/48*     (2006.01)
*G06F 1/3228*   (2019.01)

(52) U.S. Cl.
CPC .......... *G06F 9/4856* (2013.01); *G06F 1/3228* (2013.01)

(58) Field of Classification Search
None
See application file for complete search history.

(56) References Cited

U.S. PATENT DOCUMENTS

| | | | | |
|---|---|---|---|---|
| 4,792,766 | A * | 12/1988 | Wieschhoff | H03F 1/52 330/146 |
| 5,016,168 | A * | 5/1991 | Liu | G06F 12/0828 711/124 |
| 9,753,773 | B1 | 9/2017 | Bodick et al. | |
| 2006/0253715 | A1* | 11/2006 | Ghiasi | G06F 1/3203 713/300 |
| 2011/0213934 | A1 | 9/2011 | Greenhalgh et al. | |
| 2013/0246820 | A1* | 9/2013 | Branover | G06F 1/206 713/320 |
| 2014/0317389 | A1* | 10/2014 | Wenisch | G06F 1/20 712/229 |
| 2016/0124476 | A1 | 5/2016 | Mittal et al. | |
| 2017/0177407 | A1* | 6/2017 | Therien | G06F 9/5094 |

(Continued)

OTHER PUBLICATIONS

Wikipedia, "Bus snooping", https://en.wikipedia.org/wiki/Bus_snooping, Accessed on Jul. 31, 2018, 4 pages.

*Primary Examiner* — Meng Ai T An
*Assistant Examiner* — Zujia Xu
(74) *Attorney, Agent, or Firm* — Samuel A. Waldbaum

(57) ABSTRACT

Embodiments of the present invention disclose a method, computer program product, and system for processing a thread of execution on a plurality of independent processing cores. In various embodiments, a run state and a local maximum thermal power is assigned to each of at least part of the cores. A first one of the cores is set to the active state. The thread on the first core in the active state is processed. The processing of the thread on the first core for fulfilment of an interrupt condition is monitored. A second one of the cores is set to the active state. The processing of the thread on the first core is halted. The processing of the thread to the second core is transferred. The processing of the thread on the second core in the active state continues and the first core is set to the cooling state.

18 Claims, 8 Drawing Sheets

(56) References Cited

U.S. PATENT DOCUMENTS

2018/0088638 A1\* 3/2018 Nguyen ................ G06F 1/3206
2019/0050032 A1\* 2/2019 Wang .................. G06F 11/3433
2019/0065242 A1\* 2/2019 Therien ................ G06F 1/3287

\* cited by examiner

THERMAL CAPACITY OPTIMIZATION FOR MAXIMIZED SINGLE CORE PERFORMANCE

BACKGROUND

The present invention relates generally to the field of overclocking, and more particularly to overlocking in the environment of a computer system with one or more multi-core processors offering the capability of controlling the cores for overclocking individually.

For a wide range of processors, it is possible to increase their performance by increasing the clock rate. Often an increase in clock rate simultaneously increases the operating voltage to a value beyond its nominal operating specification without damaging the processor. This technique, which is generally referred to as overclocking, causes the processor to generate an increased amount of heat, which is typically dissipated by a cooling system to prevent the processor from damage by overheating. The processing speed which can be achieved by overclocking is therefore usually considered to be limited by the cooling performance which is available to the processor.

SUMMARY

Embodiments of the present invention disclose a method, computer program product, and system for processing a thread of execution on a plurality of independent processing cores. In various embodiments, a run state and a local maximum thermal power is assigned to each of at least part of the cores, the run state being selected from a group of run states, the group of run states comprising at least an active state and a cooling state, the active state comprising, for a given core, an operational parameter of the core being set such that the power dissipation of the core under workload is expected to exceed the local maximum thermal power of the core, the cooling state comprising, for a given core, the operational parameter of the core being set such that the power dissipation of the core stays below the local maximum thermal power of the core. A first one of the cores is set to the active state. The thread on the first core in the active state is processed. The processing of the thread on the first core for fulfilment of an interrupt condition is monitored. In response to the interrupt condition being fulfilled, a second one of the cores is set to the active state. The processing of the thread on the first core is halted. The processing of the thread to the second core is transferred. The processing of the thread on the second core in the active state continues and the first core is set to the cooling state.

DETAILED DESCRIPTION

Figure 1:
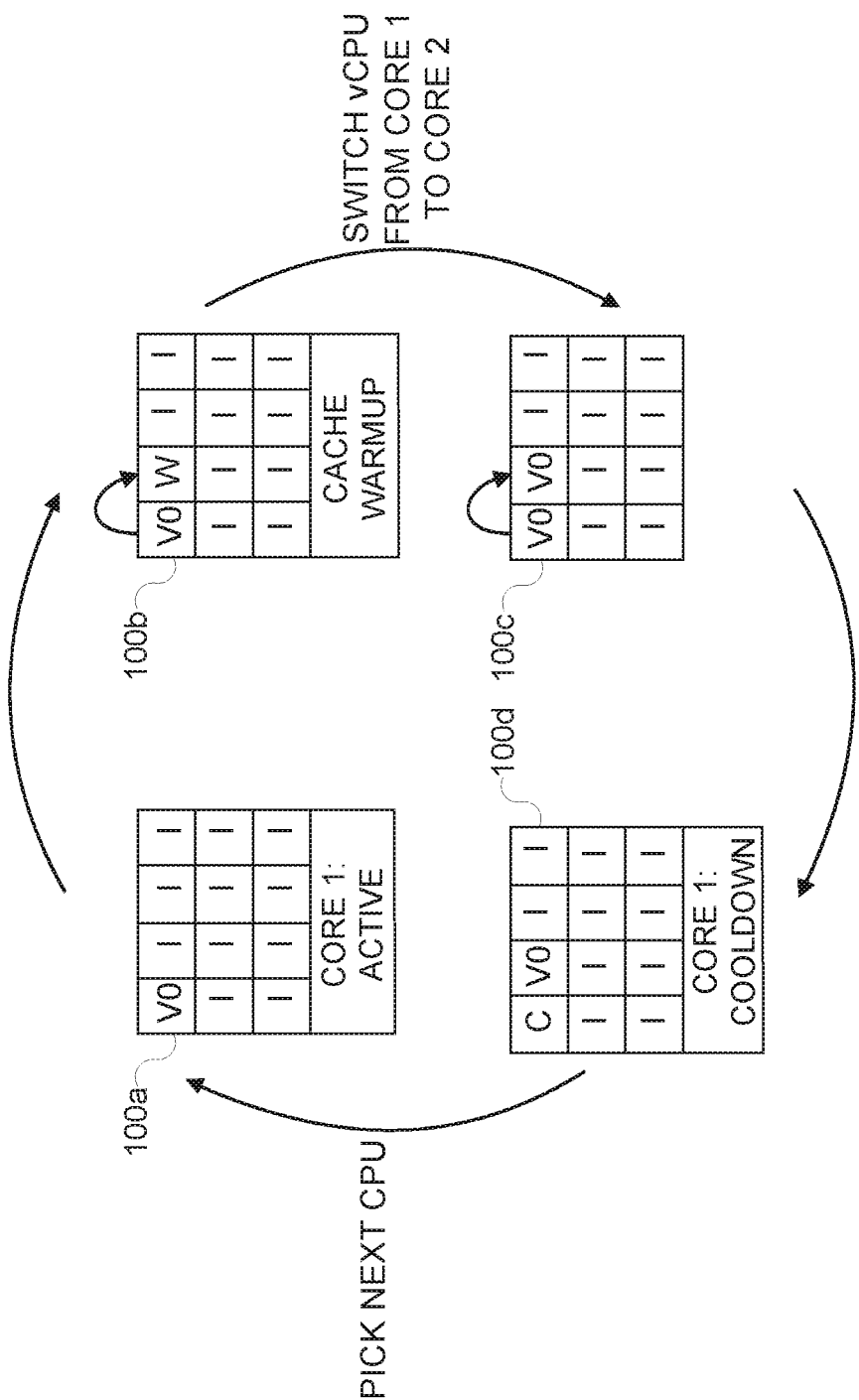
FIG. 1 is a functional block diagram illustrating plurality of processing cores undergoing a processing—cooling cycle, in accordance with an embodiment of the present invention.

Embodiments of the present invention relate to the field of computing, and more particularly to overlocking in the environment of a computer system with one or more multi-core processors offering the capability of controlling the cores for overclocking individually. The following described exemplary embodiments provide a system, method, and program product to, among other things, process a thread of executions on a plurality of independent processing cores in order to set cores into an active or cooling state. Therefore, the present embodiment has the capacity to improve the technical field of overclocking by increasing cooling efficiency by minimizing the heat output of a core through development of alternative counting patterns that provide more efficient cooling benefits to a system under load.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Multi-core processors are typically controlled in a manner which is optimized for throughput, allowing a process, a task or a program to be processed as a plurality of concurrent threads by the multiple cores in parallel. However, in some scenarios it is more desirable to process a single, time-critical thread with the highest performance available. It may be advantageous to maximize the processing speed of a single thread in a multi-core processing environment.

In various embodiments of the invention, a single thread is processed by a single processing core at very high speed for a short time, transferred to a different core, and then continued to be processed by the receiving core with a similarly high speed. After the thread has been transferred to the receiving core, the first core is set to the cooling state so that the heat generated by the first core during the overclocked processing of the thread can be dissipated. Subsequently, the thread may be handed on from the receiving core to a further core, repeating the procedure as described before. In this way, it may be possible to process the thread at an extraordinarily high speed compared to the nominal processing speed of a single core (e.g., twice the nominal clock frequency or more).

As the overclocked processing of the single thread may be permanently limited both spatially and in time, excessive amounts of heat exceeding the local maximum thermal power per core can be dissipated safely without risking failure or damage of a core by overheating. While the maximum allowable heat density which can be dissipated by a present cooling system in a theoretical scenario of equal workload distribution over all cores may be exceeded locally, the cooling system may still be able to handle the excessive heat if the total dynamic heat capacity of the cooling system is not exceeded. It should be appreciated that embodiments of the invention may advantageously provide a multi-core processing environment with a high-speed or priority single-thread processing mode which enables to process a single, time-critical thread with the highest performance available.

As each core in the system may be overclocked only for a short time interval, for example, in the range of megacycles per second, Mc, or milliseconds, ms, the operating parameters governing its processing speed, or "speed parameters" of the core, can be chosen more freely than would be possible when overclocking for a long time or permanently. In various embodiments, the speed parameters is limited by functional correctness and stability of the processor rather than thermal considerations.

The terms "long-time overclocking" and "short-time overclocking" are understood herein as relating to a time constant of heat transport from the processor to the warm side of the cooling system. The speed parameters are mainly the clock rate (or clock frequency) and the operating voltage, but further parameters may allow for influencing the processing speed of a core, including, but not limited to, a time slice, a register value and/or a clock-gating signal.

In various embodiments, the local maximum thermal power or "LMTP" of a core and nominal thermal limit of a core are the largest amount of heat power which the cooling system of the processor hosting the core is able to dissipate continuously from the fraction of die area covered by the core without exceeding the maximum temperature at which the core can be operated without overheat damage. In various embodiments of the present invention, cooling systems exist which dynamically adapt the cooling power to, for example, the current processor temperature and/or workload. However, the LMTP is defined as a constant, based on the maximum cooling power which the cooling system is able to provide, therefore, the upper end of the control range (peak performance) for cooling systems varies with variable power.

In various embodiments, a single thread may be processed on a plurality of processing cores by subsequent processing on a single core at a time, handing over the processing environment to a next core and continuing the processing on the next core. It should be appreciated that the processing may be fully parallelizable if a sufficiently high number of processing cores is available to designate a first plurality of cores for processing a first thread, a second plurality of cores for processing a second thread, and so forth. Thus, multi-threaded overclocking with a single-thread optimization beyond nominal thermal limits may be provided. In various embodiments, the heat capacities of different processor cores may be managed, such that the processing speed of a thread is maximized.

In an exemplary embodiment, at least two run states are envisaged for each core. First, an active state where the core is overclocked beyond its nominal thermal limit, and second, a cooling state where the core is in a state of reduced power consumption and/or heat generation. In the active state, the core can be processing a thread or ready for processing, while it can be processing, ready for processing, or idle (halted (C1), stop-clock (C2), sleeping (C3), energy-saving, clock-gated, etc.) in the cooling state. The cooling state is defined so as to minimize the heat output of the core (e.g., in ACPI C3 mode). A core in the cooling state may continue to process other threads or be exempt from processing to increase cooling efficiency.

Alternatively, the cooling state may be chosen with underclocking speed parameters, for example, none of the speed parameters exceeds the nominal specifications and at least one of them is below its nominal value or range. In an additional example, the cooling mode includes setting the clock frequency to the lowest value of its nominal range and the voltage to half of its nominal value.

In the active state, one or more speed parameters of the core are set to a value for which the heat power generated by the core can be expected to exceed its nominal thermal specifications (i.e., the LMTP). This may exclude lower overclocking states where the speed parameters are merely close to their nominal values (e.g., a clock rate of 3.2 GHz instead of 3.1 GHz), for which overhead cooling power is available from the cooling system. It should be appreciated that while various embodiments exhaust and go beyond this possible overhead performance with spatial and temporal limitation, other embodiments may utilize speed parameters corresponding to heat generation in the overhead range and/or speed parameters in nominal ranges.

In various embodiments, for a given thread for the first time, the first core may be selected in a similar manner as described below for embodiments where the second core is selected from the plurality of processing cores. Its selection may be based, without limitation, on a temperature figure and/or performance figure of the core, its sequence number in a counting pattern, its run state, a local cooling power figure, a timer value, or a combination thereof. It is understood that the second core is not identical to the first core.

The processing of the thread may be monitored in various ways. In various embodiments, the processing time is counted on the first core and the processing is halted after a predetermined time interval has passed (interrupt condition), wherein the time interval is preferably chosen such that an assumed upper limit of the heat generated by the processing can be dissipated in a controlled way, without damaging or deteriorating the first core or other parts of the processor.

Additionally, the monitoring may include measuring a status figure of the core, e.g. its temperature or power consumption. Accordingly, the interrupt condition may relate to a threshold value for the temperature or energy (power times processing time). A temperature figure may be measured e.g. on-die, on the processor package, or at a certain location of the cooling system (e.g. the temperature of a water film cooling the package).

Additionally, one or more status figures of the core (e.g., a temperature figure, a heat power or energy figure and/or an electrical power or energy figure) may be predicted. In this case, the interrupt condition may relate to a received signal indicating that a predetermined value has been reached, and/or one or more of the predicted figures themselves.

In various embodiments, the interrupt condition may generally refer to various characteristics, including, but not limited to, absolute or differential figures of temperature, time, power or performance, energy, operational parameters including the speed parameters, etc. Parameters may for instance be referred to directly or using sub-conditions.

When the interrupt condition is reached, the processing of the thread on the first core is halted. In halted state, the first core ceases to continue processing the next instruction, while at least all non-exclusive information (at least part of the instruction sequence, memory content, cache lines, registers, etc.) remains accessible from the external. This allows for transferring the thread to the second core, which may mirror the state of the first core before the processing can be continued on the second core. The transfer may include, if possible, mirroring all exclusive information such that the processing can be continued without loss of information. However, it may be possible alternatively to discard e.g. exclusive cache lines and continue the processing without them if the discarded information can be restored later, e.g. from a different cache level.

In various embodiments, while the core-to-core transfer of a thread typically requires time in the order of microseconds (μs), or kilocycles per second (kc), the speed parameters may, in the active state, be chosen low enough that the time slice for the processing (on the first core) is large compared to the transferring time (e.g. in the Mc range).

In various embodiments, the processing may be performed in an environment without virtualization, such that e.g. an operating system (OS) and/or dedicated hardware manages the assignment and transfer of the thread to the different processing cores. On the other hand, fully virtualized implementations (e.g., transparent to the OS) are possible where the OS relates the processing of the thread to a single core while the actual core processing the thread is managed on a deeper (hardware) level. Semi-transparent virtualization is likewise possible, e.g. where the OS merely initiates the processing transfer, causing a hypervisor (hardware and/or software) to determine the target core (the second core) and subsequently transfer the thread to that core. Alternatively, a dedicated hardware unit (herein referred to as "measurement and prediction unit", MPU) may be implement, e.g. assigning the run states to the cores and monitoring their temperatures, using existing routines of the virtualization environment. In another alternative, software is implemented (e.g., a service or daemon) running on the OS (the same OS where the parent process of the thread was started, or likewise a concurrent OS managed by the hypervisor), e.g. having dedicated routines (library) to manage the assignment of the run states and the processing transfer.

It should be appreciated that, the phrase "being based on" and the like is meant inclusively, i.e., the referring entity does not solely depend on the referred entity but may rather comprise further dependencies. Furthermore, the term "figure", wherever it denotes a number or value, shall equally cover measured and calculated (predicted) values. A "core-specific figure" may denote either a value which is measured or calculated for a particular core, or an effective value for a particular core derived from another value which was originally determined on a larger scale (e.g. relating to the die or processor as a whole).

According to embodiments, at least part of the cores further comprise a core-specific cache, the group of run states further comprising a warmup state, the warmup state comprising, for a given core, caching a shared copy of a non-exclusive cache line from the core-specific cache of the first core in the core-specific cache of the given core; and withdrawing the shared copy from the core-specific cache of the given core in case the first core requires the cache line to be exclusive. Furthermore, the processing of the thread may be monitored on the first core for fulfilment of a warmup condition. In response to the warmup condition being fulfilled, the second core is set to the warmup state.

The term "warmup" is not meant in a thermal sense, but rather indicating that the second core advantageously has its cache prefilled in preparation for receiving the thread for processing in the active state. This may reduce the required time for the transfer and thus increase the effective processing speed of the thread.

The warmup condition may be defined such that the warmup state is activated prior to the active state. In an "early warmup" scenario, the second core is set to the warmup state at the same time as the first core starts processing the thread, or earlier. This is however not required; the warmup condition may rather reflect a typical timescale for cache synchronization, or it may, for instance, refer to a threshold temperature sufficiently below a (higher) threshold temperature defining the interrupt condition.

According to embodiments, the warmup condition is based on: a timer value; a core-specific temperature figure; a core-specific power figure; and a combination thereof.

A pre-determined timer value may be beneficially, but not necessarily, used to match a further timer value referred by the interrupt condition with a desired time difference. In an example, the warmup begins 4 ms after the first core hast started processing the thread, and the processing is scheduled to halt after 5 ms, so there is 1 ms left to perform cache synchronization. In another example, the interrupt condition relates to a threshold temperature of 50° C., which is known to be reached, starting with the first core at 30° C., not sooner than after 8 ms of processing. The warmup condition is thus defined so as to start cache synchronization after 5 ms, allowing the cache manager to synchronize for at least 3 ms. Likewise, the warmup condition may relate to a measured or predicted temperature threshold of 40° C. in the example, or a predicted time when the temperature threshold is likely to be reached. A power figure may relate to a measured or predicted electrical input, thermal output, or available cooling power, and may be especially useful in combination with a timer value (e.g. the processing time) to determine an amount of transferred energy. For example, the second core is set to the warmup state at the time when the first core is predicted to have taken up 0.5 J of electrical energy. In various embodiments, the second core is selected from the plurality of cores.

Further embodiments do not need the step of selection, where the position of the second core is predetermined for all cores of the plurality. In contrast, it may be advantageous to select the second core in order to optimize find a core which optimally suits the current situation. In an exemplary embodiment, the second core is selected before the processing on the first core is interrupted.

For example, the plurality of cores (the "single-thread cores") is part of a larger plurality of all cores present on a single die. The cores not belonging to the single-thread cores perform multi-thread processing in a known manner (the "multi-thread cores") and generate a rather uniform heat density spreading into the cooling system, but also through the die into the single-thread cores. Some of the single-thread cores are located closer to the multi-thread cores than the others and therefore have a higher temperature. In this example, an advantageous choice for the second core may be one of the single-thread cores that has a low temperature (e.g., the core having the lowest temperature), or one that has a large (the largest) distance from the multi-thread cores.

In another example, the core temperatures are predicted or measured subsequently, and the first core having a temperature below a predetermined threshold temperature is selected. This may have the advantage of accelerating the selection process by avoiding the effort of finding the minimum temperature. Further examples, without limitation, may choose a core which has been idle for a certain time (e.g. longer than a threshold time or longer than the other cores form the plurality), and/or a core which is located away from the first core by at least a pre-determined distance.

According to embodiments, the selection may be based on: a counting pattern, a core-specific temperature figure, a core-specific performance figure, a local cooling power figure, the run state, a timer value, and/or a combination thereof.

A counting pattern may account for the spatial arrangement of the cores on the die (or dies if the cores are disposed on a plurality of dies). This may be advantageous to ensure a uniform distribution of workload and heat (on time average), which may result in a more efficient heat dissipation and obviate mechanical stress inside the die due to inhomogeneous heat density. Using a counting pattern may also reduce the down time between two subsequent single-core processing cycles of the thread as the position of the second core is determined without calculations.

A core-specific performance figure is either a core-specific power figure (e.g. electrical or heat power) or any other value indicative of the current performance of the core (e.g., the speed parameters, particularly the current clock rate and/or operating voltage). It may for instance be beneficial to prefer a core which is running with underclocking parameters to cores running at nominal speed. Likewise, a core may be selected according to its run state, preferably if it is in the cooling state. A temperature figure may allow for selecting a core with a comparably low (lowest) temperature. Analogous considerations as described further above may apply for selecting the second core based on a timer value and/or a power figure.

According to embodiments, the counting pattern is based on a rule providing the second core at a non-nearest neighbor position. This may contribute beneficially to minimize the influence of the heat generated by the first core during the processing on the second core, and therefore to ensure that each subsequent core starts processing the thread under comparably equal thermal conditions. This may reduce the risk of unintentional overheating.

According to embodiments, the cores are incorporated with a plurality of thermally separated units, the selection being based on a unit-switching rule providing the second core in one of the units which differs from the unit incorporating the first core. According to embodiments, the unit-switching rule is based on: a number of the cores in the same unit as the first core having finished processing the thread in the active state, a timer value, a temperature figure of one of the units, a figure of heat energy generated in one of the units, and/or a combination thereof.

It should be appreciated that the subdivision of the plurality of processing cores may be thermally separated units and defined by the availability of independent cooling systems for the plurality of cores, wherein the cores of each unit are cooled by one of the independent cooling systems, and wherein two cooling systems are considered independent if their temperatures (their respective average temperatures on the warm side, i.e. at the point of thermal coupling to the die hosting the cores or its package) are controlled individually and/or there is no significant thermal coupling between them. In an example, a computer system comprises two multi-core CPUs, wherein each of the CPUs is cooled by a dedicated air cooler (heat sink plus fan), the plurality of processing cores may be subdivided into two units, and the participating cores of each of the two CPUs form one of the two units.

The availability of more than one cooling system to the plurality of cores may have the advantage that an increased cooling power per unit area (per core) is available. The heat generated by each core during the processing may be dissipated more efficiently, resulting in shorter cool-down times per core. This may allow for performing the setting with a smaller number of cores and/or overclocking each core to a higher processing speed as would be possible with merely a single cooling system.

Processing in the active mode may be switched between the thermally separated units on a regular base to obtain a more homogeneous distribution of heat emission. For example, a regular unit-switching rule may schedule every second, third, fourth, fifth, etc. thread transfer to be relocated on a different die with a dedicated cooling system. While a more frequent die switching may be desirable to achieve a more homogeneous heat distribution, a lower die-switching frequency may be more feasible as die switching usually incurs higher time costs than on-die thread transfers. However, an irregular unit-switching rule, e.g. based on temperature measurements, may likewise be feasible in certain usage scenarios.

According to embodiments, the cooling state further comprises, for a given core, preventing the core from processing. This may have the advantage that a core in the cooling state can cool down to a lower temperature than would be possible if the core were allowed to continue processing. In this way, a higher number of cool cores may be available as candidates for the second core, and thus, a subsequent heat-up of the plurality of cores due to insufficient cooling may be prevented.

According to embodiments, the interrupt condition is based on: a timer value; a core-specific temperature figure; a core-specific power figure; and a combination thereof.

Using a timer may be advantageous if an empirical value is known for e.g. a shortest or average time it takes for a single core to generate a certain temperature increase or amount of heat energy, as no dedicated hardware (e.g., sensors) may be needed to determine such quantities. A timer-controlled management of the active state may simplify the effort for performing the processing, as no real-time monitoring and/or calculation may be needed. However, in cases where stronger variations in heat or temperature occur and/or the processor is sensitive even to slight overheating, it may be more advantageous to use measured and/or calculated temperature and/or power figures to determine to correct time for interrupting the processing of the thread in the active mode.

According to embodiments, core-specific status information may be received for at least part of the cores, the interrupt condition and/or the warmup condition and/or the selection of the second core and/or the unit-switching rule being based on the received status information. According to an additional embodiment, core-specific status information may be predicted for at least part of the cores, the interrupt condition and/or the warmup condition and/or the selection of the second core and/or the unit-switching rule being based on the predicted status information.

Core-specific status information is understood herein as any kind of data which is descriptive of or assigned to a particular core and which is no data involved in or kept ready for processing jobs of the core. The receiving may include measuring (e.g. using a sensor) a status value or reading a status value (e.g., a flag) from the register of the core. This may have the advantage of enhancing the basis of available information for the interrupt condition and/or the warmup condition and/or the selection of the second core and/or the unit-switching rule, and may therefore allow for defining them with more refined logical query statements.

Core-specific status information may also be predicted, which may relax the hardware requirements for measuring such information and/or allow for deriving quantities which are not accessible by measurements or available e.g. from the register.

According to embodiments, all cores of the plurality of cores may be kept in the cooling state which are not appointed the first core or the second core. This is in contrast to cases where cores other than those appointed first or second core remain in the active state (without performing further processing tasks) or the warmup state, and may have the advantageous effect of minimizing the amount of heat generated by the plurality of cores, minimizing the temperature of those cores which are not processing the thread, and thus maximizing the number of fully cooled-down cores available as candidates for the second core.

According to embodiments, a given core, after processing the thread in the active state, remains in the cooling state until a restore condition is fulfilled, the restore condition being based on: a timer value; a core-specific temperature figure; a number of the cores having finished processing the thread; and a combination thereof.

This may beneficially provide an automatic warmup function, such that a larger number of warmed-up cores (cores in the warmup state) may be available when the processing on the first core is interrupted. This may be at the cost of an increased heat emission by the cores in the warmup state, but it can be assumed that this heat emission is small compared to the heat generated by a core processing the thread in the active state. In analogy to the explanations above, a timer-defined restore condition may be based on an empirical value for the time a core usually needs after the processing to cool down to a temperature minimum in the cooling state, and may render unnecessary further devices (such as sensors) and efforts for providing data on which the restore condition may be decided. However, the restore condition may likewise be based on a predefined temperature minimum for the given core, such that the core may e.g. switch to the warmup state if the temperature falls below this temperature minimum.

Another possibility is to count a number of cores having finished processing the thread, e.g. the number of cores which have finished to process the thread subsequent to the given core. In an example, the plurality of cores comprises eight cores, with one core having just started to process the thread in the active state and one core being in the warmup state. A given one of the remaining six cores has already processed the thread, and the current first core is the fifth core to process the thread subsequent to the given core. The restore condition provides for switching a core to the warmup state after four subsequent cores have finished the processing. As the first core is the fifth to follow the given core and has just started to process the thread, the given core is switched to the warmup state.

According to embodiments, the system further comprises means for measuring a physical status of the first core, the means for monitoring the processing of the thread on the first core for fulfilment of the interrupt condition being adapted for receiving from the means for measuring the physical status of the first core a physical status information descriptive of the physical status of the first core, and for determining the fulfilment of the interrupt condition based on the physical status information received.

This may advantageously allow for interrupting the first core based on current empirical data, such that it may be possible to relax assumptions, or reduce the number of assumptions, of a thermal model of the cores. A physical status may include, without limitation, a temperature, an electrical power and/or a thermal power, but also known current values descriptive of other devices which are thermally attached to the core, e.g. a rotational speed of a cooling fan.

According to embodiments, the system further comprises means for measuring a physical status of a candidate core from the plurality of cores, and means for selecting the second core from the plurality of cores, the means for selecting the second core being adapted for receiving from the means for measuring the physical status of the candidate core a physical status information descriptive of the physical status of the candidate core, and for selecting the candidate core as the second core based on the physical status information received.

This may advantageously allow for selecting the second core based on current empirical data, such that it may be possible to relax assumptions, or reduce the number of assumptions, of a thermal model of the cores.

According to embodiments, at least part of the processors further comprise a core-specific cache, the group of run states further comprising a warmup state, the warmup state comprising, for a given core, caching a shared copy of a non-exclusive cache line from the core-specific cache of the first core in the core-specific cache of the given core; and withdrawing the shared copy from the core-specific cache of the given core in case the first core requires the cache line to be exclusive, the system further comprising means for measuring, a physical status of the first core, and means for setting the second core to the warmup state in case the measured physical status fulfils a warmup condition.

This may allow for determining an optimal time for starting cache synchronization of the second core based on current empirical values. In an example, the second core is set to the warmup state if its temperature falls below a predefined minimum temperature. In another example, the first core is a neighbor of the second core and the heat generated during the processing of the thread by the first core spreads into the second core e.g. through the die and/or its package. In this example, the second core is set to the warmup state when the rise in temperature exceeds a predetermined value, e.g. 1° C.

According to embodiments, the cores have an identical microarchitecture. This may yield a simpler thermal model of the plurality of cores as all cores can be expected to show an identical thermal behavior when processing the thread under equal thermal starting conditions.

Figure 3:
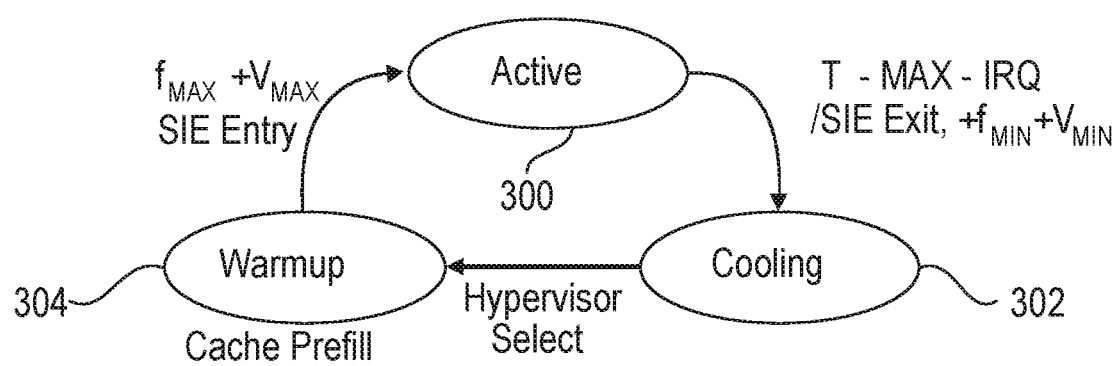
FIG. 3 is a flowchart illustrating the processing—cooling cycle for a single core, in accordance with an embodiment of the present invention.

Referring now to FIGS. 1 and 3, a functional block diagram is illustrated depicting a plurality of processing cores undergoing a processing—cooling cycle, in accordance with an embodiment of the present invention. The plurality of twelve processing cores 100 is provided for processing a thread with single-core performance optimization, designated by four sets of cores 100 (set 100a, set 100b, set 100c, and set 100d). Each core 100 is in one out of the three run states "active" 300 (abbreviated "V0" in reference to FIG. 1), "warmup" 304 ("W"), and "cooldown" or "cooling" 302 ("C", "I", with "I" denoting a core 100 in cooldown state having reached a minimum temperature).

In the upper left quarter of the cycle, comprises one core of set 100a as processing the thread in the active state 300 while all other cores of set 100a are at their respective minimum temperatures, which may individually depend on conditions of entities outside of the plurality (e.g., further neighboring cores 100 generating heat because they are not participating in the processing). As a warmup condition is reached, a second core 100 is set to the warmup state 304 and starts synchronizing its local cache, as seen in set 100b (upper right, the synchronization being indicated by a curved arrow from the first core 100 to the second core 100). As an interrupt condition is fulfilled, the processing environment (including cache, instructions, registers) is transferred to the second core 100, and the second core 100 is set to the active state 300, as depicted in set 100c (lower right, the transfer being indicated by a curved arrow from the first core 100 to the second core 100). Subsequently, as depicted in set 100d, the first core 100 is set to the cooldown state 302 and a third processing core 100 is provided (by a predetermined sequence or a selection according to a selection rule) to take over the processing task from the second core 100. The first core 100 of the next cycle being defined as the second core 100 of the finished cycle, and the second core 100 of the next cycle being defined as the third core 100 of the finished cycle.

Figure 2:
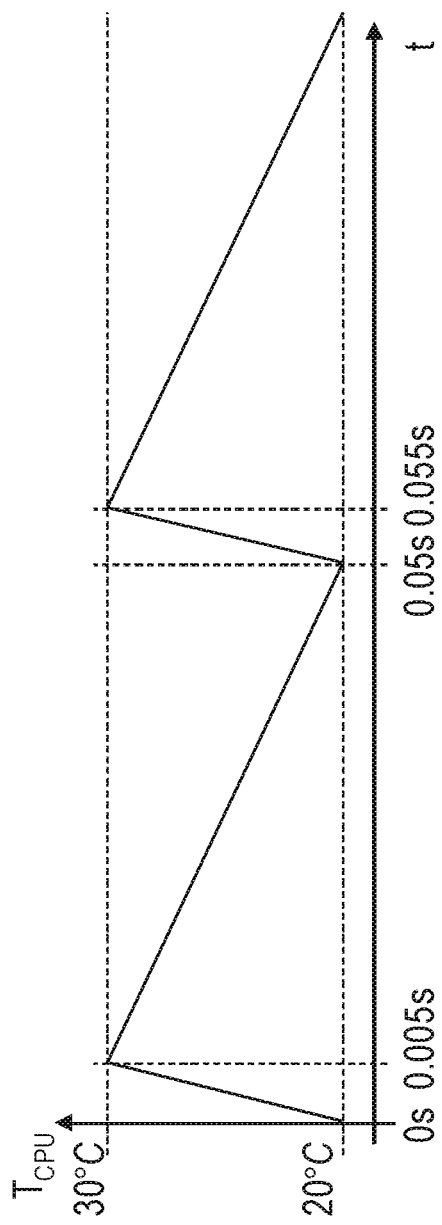
FIG. 2 graphical representation illustrating the time line of a single-core temperature, in accordance with an embodiment of the present invention.

FIG. 2 shows a graphical representation of a theoretical time diagram of a temperature assigned to a single processing core 100 undergoing two exemplary cycles of the method, similar to the cycle shown in FIG. 1. The assigned temperature shown in the diagram is defined as the temperature of a 0.1 mm thick layer of cooling water on the core area of 1 cm2. The core 100 is configured to consume an electrical power of 80 W in the active state 300 and starts processing the thread in active state 300 at 20° C. and the interrupt condition provides that the processing be halted when the assigned temperature exceeds 30° C. The heat energy thus emitted by the core 100 and dissipated by the water layer is approximately (30° C.-20° C.)×4187 J/(° C.×1)×(1 cm2×0.01 cm/(1000 cm3/1))=41870 J/1×10-51=0.4187 J=0.4187 Ws. At 80 W, the core 100 takes about 0.4187 Ws/80 W=5 ms to locally heat up the cooling water layer to 30° C. This phase is pictured in the diagram as a rising section of the temperature graph which ends at a dashed horizontal line.

The core 100 is then switched to the cooling state 302, allowing the cooling system to exchange the heated water layer and cool down the core 100 to 20° C. The interrupt temperature of 30° C. has been selected such that the core 100 just reaches its temperature minimum of 20° C. after 45 ms. This corresponds to the time the remaining nine processors, which are assumed to have an identical microarchitecture so that their thermal behavior is equal to the first core 100, take to continue with the subsequent processing of the thread (dashed vertical line after 50 ms). Then, the cycle starts again with the first core 100 processing the thread, heating up the cooling water layer once more from 20 to 30° C., and cooling down again in the time interval from 55 to 100 ms. With an assumed core-switching cost of 10%, the thread is thus processed with the performance of an equivalent single-core processor with a power consumption of (10×80 W)×0.9=720 W.

FIG. 3 is a flowchart illustrating the processing—cooling cycle for an exemplary processing cycle of a single core 100 of an IBM System z computer system participating in the processing according to the method. The active state 300 is activated (arrow connecting the "Warmup" 304 and "Active" 300 fields) by setting the individual clock rate of the core 100 to an empirical value fMAX which is considered to allow for processing the thread at a highly accelerated speed (compared to its nominal processing speed) without risking overheating. The operating voltage is set to a suitable value VMAX accordingly. The core 100 is then prepared for the processing by initialization of the processing environment (instructions, cache, registers, etc.), which may be a synchronization if the core 100 is receiving the thread from another core 100 which recently finished the processing. In an alternative implementation, the core 100 is synchronized before the speed parameters are set to their respective overclocking values. The processing of the thread in the active state 300 is started by the "SIE Entry" command for starting execution of the commands associated with the thread (Start Interpretive Execution, SIE). It should be appreciated that all products and service names are trademarks of their respective owning entities.

The arrow connecting the "Active" field 300 with the "Cooling" 302 field indicates the actions taken when the interrupt condition is fulfilled. In the example shown, the monitoring results in a detection that a maximum temperature ("T-MAX-IRQ" in the diagram) is reached or exceeded. Thereupon, the processing is halted using the "SIE Exit" command. Clock rate and operating voltage are set to respective minimum voltages fMIN and VMIN, allowing for a continued operation of the core 100 at minimum heat generation.

The core 100 stays in the cooling state 302 until it is selected as the second core 100, which is done by the system's hypervisor in the example shown (arrow connecting the "Cooling" 302 and "Warmup" 304 fields). Eventually, the cycle is restarted for the core 100 as described during cache synchronization.

Figure 4:
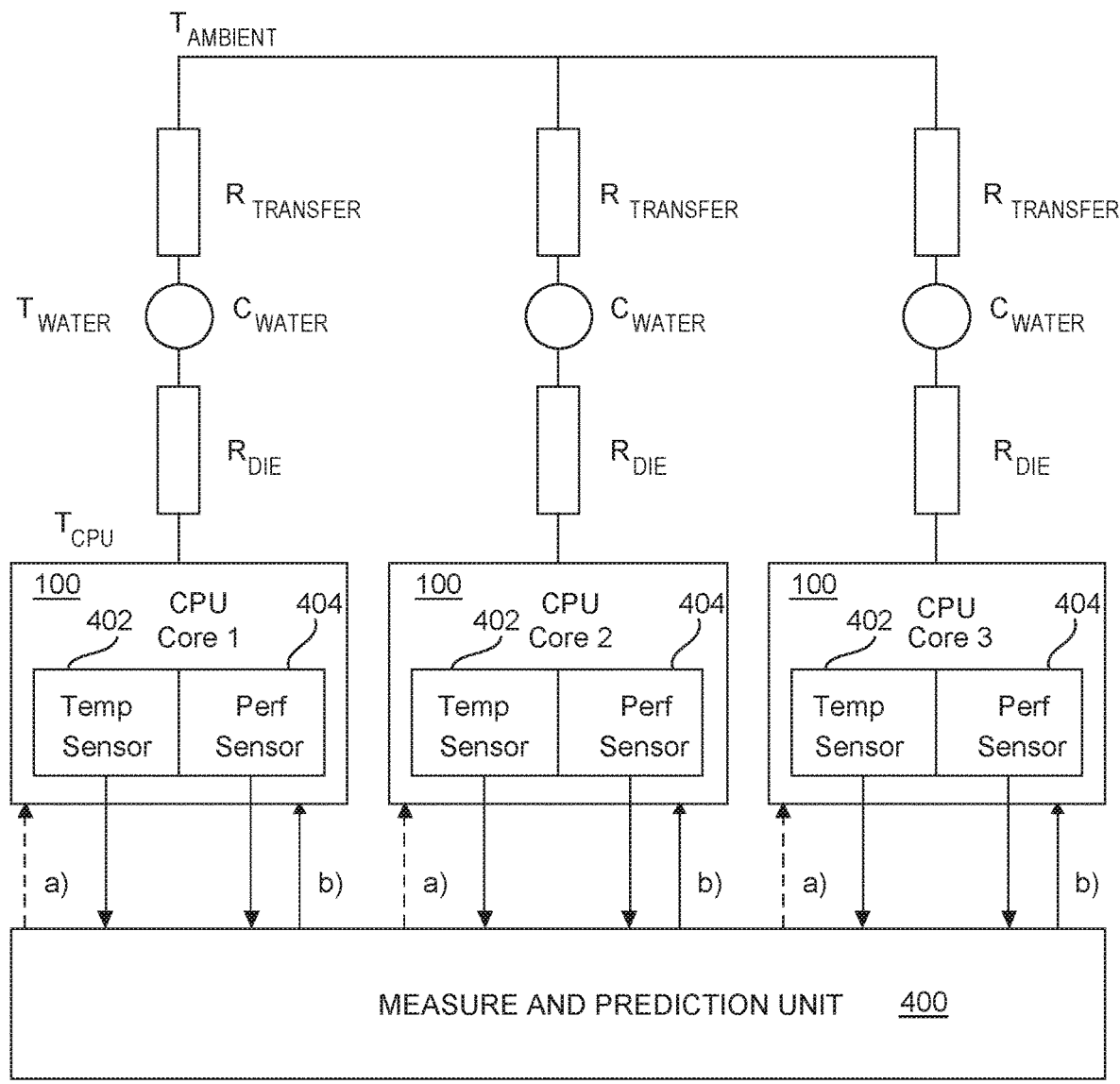
FIG. 4 is a functional block diagram illustrating three processing cores in a managed thermal environment, in accordance with an embodiment of the present invention.

FIG. 4 is a functional block diagram illustrating three processing cores 100 (Core 1 to core 3) in an exemplary managed thermal environment for performing the method. Each of the cores 100 (temperature TCPU) is equipped with a local, dedicated temperature sensor 402 and a power sensor 404. Each core 100 has a physically local thermal capacity CWATER (temperature TWATER) which is coupled to the core 100 through a thermal resistance RDIE and to an ambient reservoir (temperature TAMBIENT) through a thermal resistance RTRANSFER, which is substantially larger than RDIE.

The system of FIG. 4 further comprises a measurement and prediction unit 400, which is connected to the processing cores 100 in a way which allows for controlling their respective speed parameters ("a") arrows), controlling the executional state of a core 100 (triggering and halting the execution of the thread; "b)" arrows), and receiving measurement signals from the sensors 402, 404 (downward arrows). Furthermore, the measurement and prediction unit 400 is at least adapted for calculating a thermal model of the system, based at least on the measurement signals received from the sensors 402, 404 and known values for RTRANSFER, CWATER, RDIE, and performing the monitoring of the processing of the thread for fulfilment of the interrupt condition, based at least on the measurement signals received from the sensors 402, 404 and the thermal model. In an example, the measurement and prediction unit 400 detects that the temperature will likely exceed a predefined interrupt temperature within the current modelling cycle, and sends an interrupt signal to the current core 100 processing the thread to halt the processing and trigger execution transfer to the next core 100.

According to implementations alternative to the one shown in FIG. 4, the measurement and prediction unit 400 may be connected to one or more other units which are capable of controlling parameters of the cores 100 directly (e.g., a hypervisor) to perform the method by controlling the cores 100 (including executional state and/or speed parameters) indirectly using the other unit(s). It should be appreciated that the temperature sensor may be configured to receive temperature data and provide instructions to set cores into various states and monitor the processing of threads.

Figure 5:
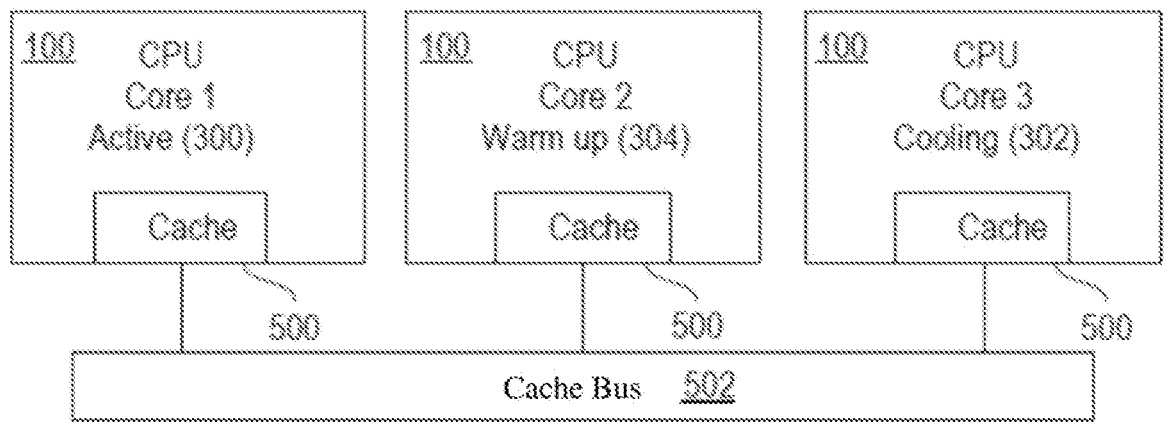
FIG. 5 is a functional block diagram illustrating three CPU cores with a shared cache, in accordance with an embodiment of the present invention.

FIG. 5 is a functional block diagram illustrating three processing cores 100, each of which having a local cache 500, and a cache bus 502 interconnecting the three local caches 500. The core 100 to the left is in the active state 300, the core 100 in the middle is in the warmup state 304, and the core 100 to the right is in the cooling state 302. The core 100 in the active state 300 is currently processing the thread and is therefore entitled to hold exclusive cache lines which cannot be accessed by external units, including the cache bus 502 and the other cores 100.

The core 100 in the warmup state 304 snoops the cache bus 502 for cache traffic from the core 100 in the active state 300 and synchronizes its local cache 500 with non-exclusive cache lines from the active core 100, 300 so that they are available when the processing is transferred to this core 100. Cache lines which are exclusive on the currently active core 100, 300 are marked "passive copy" for deletion or replacement at a later time.

In the example of a System z environment, a core 100 from the warmup state 304 to the active state 300 marks its "passive copy" cache lines as exclusive and the "SIE Entry" routine initializes the processing on active core 100, 300. A core 100 transiting from the active state 300 to the cooling state 302 completes the write-back of its outbound queue and its current workload state is captured from the SIE descriptor by the SIE Exit routine.

Figure 6:
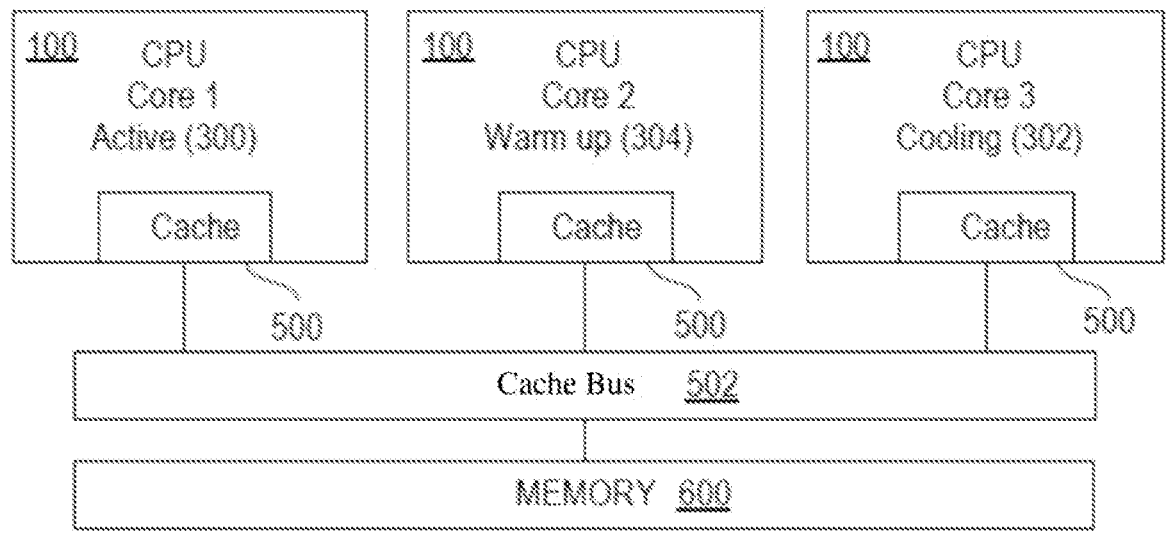
FIG. 6 is a functional block diagram illustrating three cached processing cores in a bus topology, in accordance with an embodiment of the present invention.

FIG. 6 shows a functional block diagram illustrating three processing cores 100, each comprising a local cache 500 in a bus topology, i.e. the local caches 500 are interconnected by a cache bus 502 with a link to system memory 600. One or more coherency controllers monitor the memory requests by other processors. Protocols like MOESI are used to identify which local cache 500 holds exclusive or shared copies of a cache line. The protocol ensures that the global cache state is consistent.

With cache prefilling (the warmup state 304 according to the present disclosure), a coherency controller of the local cache 500 for a core 100 that is in warmup state 304 can store data that is associated with a cache line as it observes the data flow on the cache bus 502, making it a shared cache line as opposed to an exclusive cache line for the requesting active core 100, 300. Subsequently, if the active core 100, 300 intends to change the cache line, it needs to ensure exclusive access to the line by means of the bus protocol (invalidate request), which removes the cache line from the local cache 500 of the processor that is prefilling its local cache 500.

Figure 7:
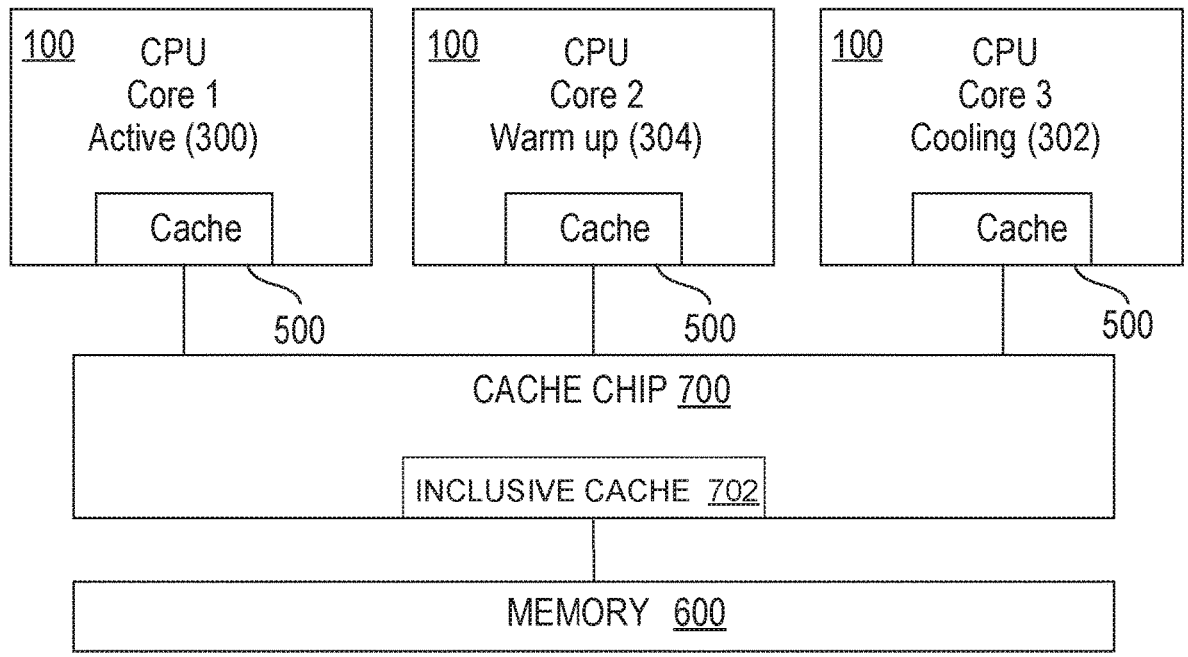
FIG. 7 is a functional block diagram illustrating three processing cores with an inclusive cache, in accordance with an embodiment of the present invention.

FIG. 7 shows a functional block diagram illustrating three processing cores 100, each comprising a local cache 500 which is representing a part of a higher-level inclusive cache 702, i.e. the local caches 500 are connected to a cache controller 700 which is hosting an inclusive higher-level cache 702 and which is linked to system memory 600. Such inclusive higher-level cache controllers 700 are typically used in System z computing systems, wherein the coherency controller in the higher-level cache controllers 700 is responsible to maintain overall cache coherency. Processors either request exclusive access to a cache line, or they request conditional exclusive access to a cache line. The coherency controller holds a directory with information regarding which line is cached in which lower-level cache.

With cache prefilling (the warmup state 304 according to the present disclosure), the cache controller 700 responds to conditional exclusive requests for cache lines by the active core 100, 300 by sending out non-exclusive copies of the cache line to both the active core 100, 300 and the core 100 that is prefilling its local cache 500. Subsequent actions to change the cache line by the active core 100, 300 will be handled according to the cache coherency protocol, typically by requesting exclusive access from the inclusive cache controller 700, which will request invalidation from the prefilling local cache 500 prior to granting exclusive access to the active core 100, 300.

Figure 8:
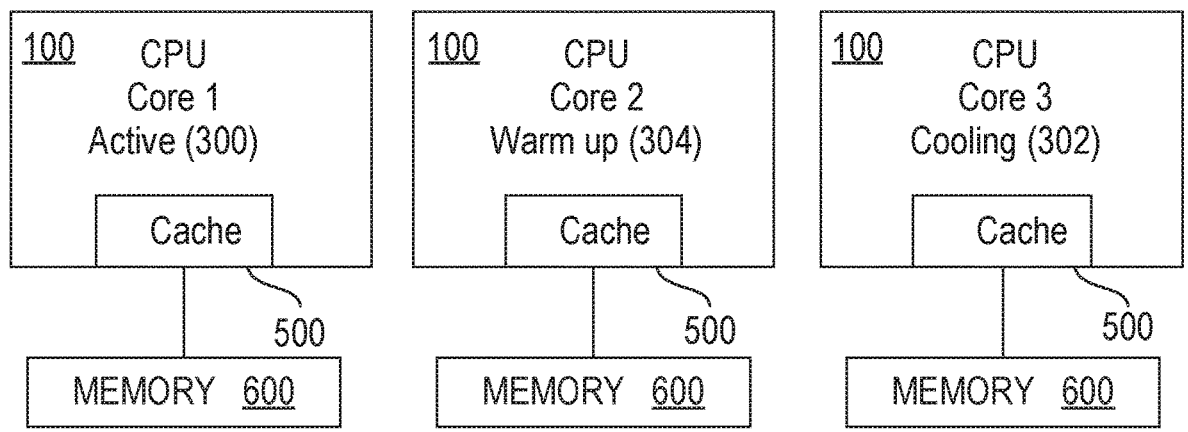
FIG. 8 is a functional block diagram illustrating three cached processing cores in a peer-to-peer topology, in accordance with an embodiment of the present invention.

FIG. 8 shows a functional block diagram illustrating three processing cores 100 in a peer-to-peer topology, each core 100 comprising a local cache 500 with a dedicated link to system memory 600. In such peer-to-peer topology, each chip is assigned a coherency controller that monitors cache line ownership by other processors. Protocols like MOESI are used to identify which local cache 500 holds exclusive or shared copies of a given cache line. The protocol ensures that the global cache state is consistent.

With cache prefilling (the warmup state 304 according to the present disclosure), a coherency controller of the local cache 500 for a processor that is in active state 300 can send cache lines that are not required to be exclusive to the processor in warmup state 304, which can store data that is associated with a cache line. This creates a shared cache line as opposed to an exclusive cache line for the requesting active core 100, 300. Subsequently, if the active core 100, 300 intends to change the cache line, it needs to ensure exclusive access to the line by means of the bus protocol (invalidate request), which removes the cache line from the local cache 500 of the processor that is prefilling its local cache 500.

Figure 9:
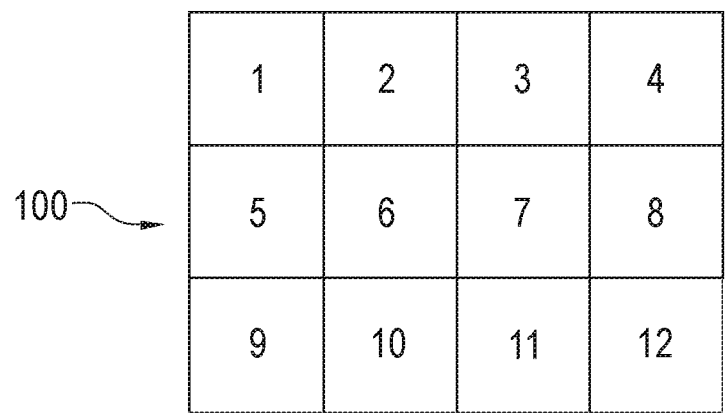
FIG. 9 is a graphical representation illustrating an exemplary counting pattern, in accordance with an embodiment of the present invention.
Figure 10:
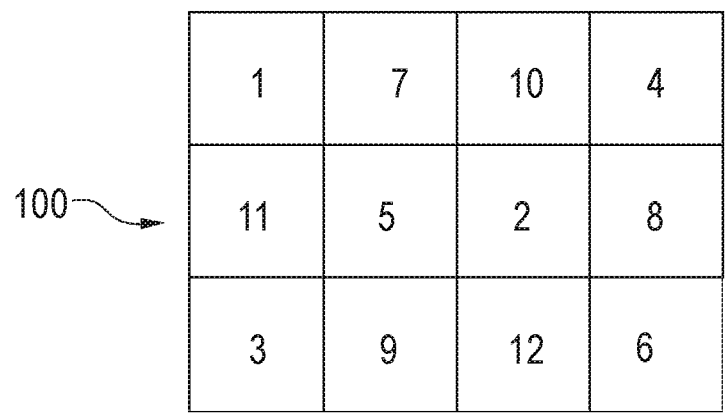
FIG. 10 is a graphical representation illustrating a second exemplary counting pattern, in accordance with an embodiment of the present invention.
Figure 11:
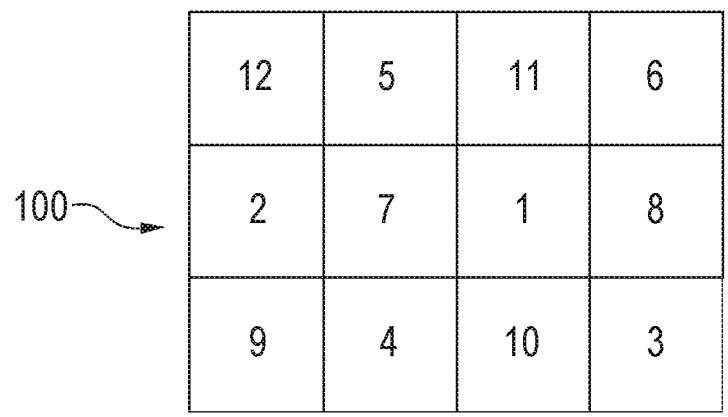
FIG. 11 is a graphical representation a third exemplary counting pattern, in accordance with an embodiment of the present invention.

FIGS. 9, 10, and 11 show three exemplary counting patterns which can be used to predetermine for any given processing core 100 which is processing the thread in the active state 300 (the first core 100) the next processing core 100 for continuing the processing in the active state 300 (the second core 100). The pattern represents a plurality of twelve cores 100 arranged in a pattern of three lines times four columns. The cores 100 are labeled "1" through "12" and the processing continues with core 1 when core 12 has finished the processing.

FIG. 9 is a graphical representation illustrating an exemplary counting pattern where the second core 100 is located to the right of the first core 100 if the first core 100 is in one of the three columns to the left of the pattern, and in the left column of the next line if the first core 100 is in the right column. The next line is defined as the lower neighboring line if the first core 100 is located in the upper or the central line, and as the upper line if the first core 100 is located in the lower line. The counting pattern thus described proceeds with the processing from left to right and line by line, such that "thermal crosstalk", as it occurs with subsequent processing on neighboring cores 100, is reduced with every transfer to the respective next line in the pattern.

FIG. 10 is a graphical representation illustrating an alternative counting pattern comprising four staggered triangular sub-patterns. The walk through the twelve cores 100 is subdivided into four triangular hops, wherein the cores 100 of each triangle are located solely either in even-numbered or odd-numbered columns to maximize the distance between two subsequent processing cores 100. This pattern was constructed for minimizing the number of subsequent executions on neighboring cores 100 in order to increase cooling efficiency, reduce the minimal temperature for each core 100 and provide a spatially homogenized thermal output.

FIG. 11 is a graphical representation illustrating another alternative counting pattern which may provide similar beneficial effects as the pattern of FIG. 10, with the difference that the walk through the twelve cores 100 is subdivided into two diagonal sub-patterns which are each walked through with one center-to-edge hop in the central line, followed by a rotation around the first core 100 of the respective sub-pattern. This pattern was constructed to minimize accumulations of near-subsequent cores 100 to enable a higher cooling efficiency.

Figure 12:
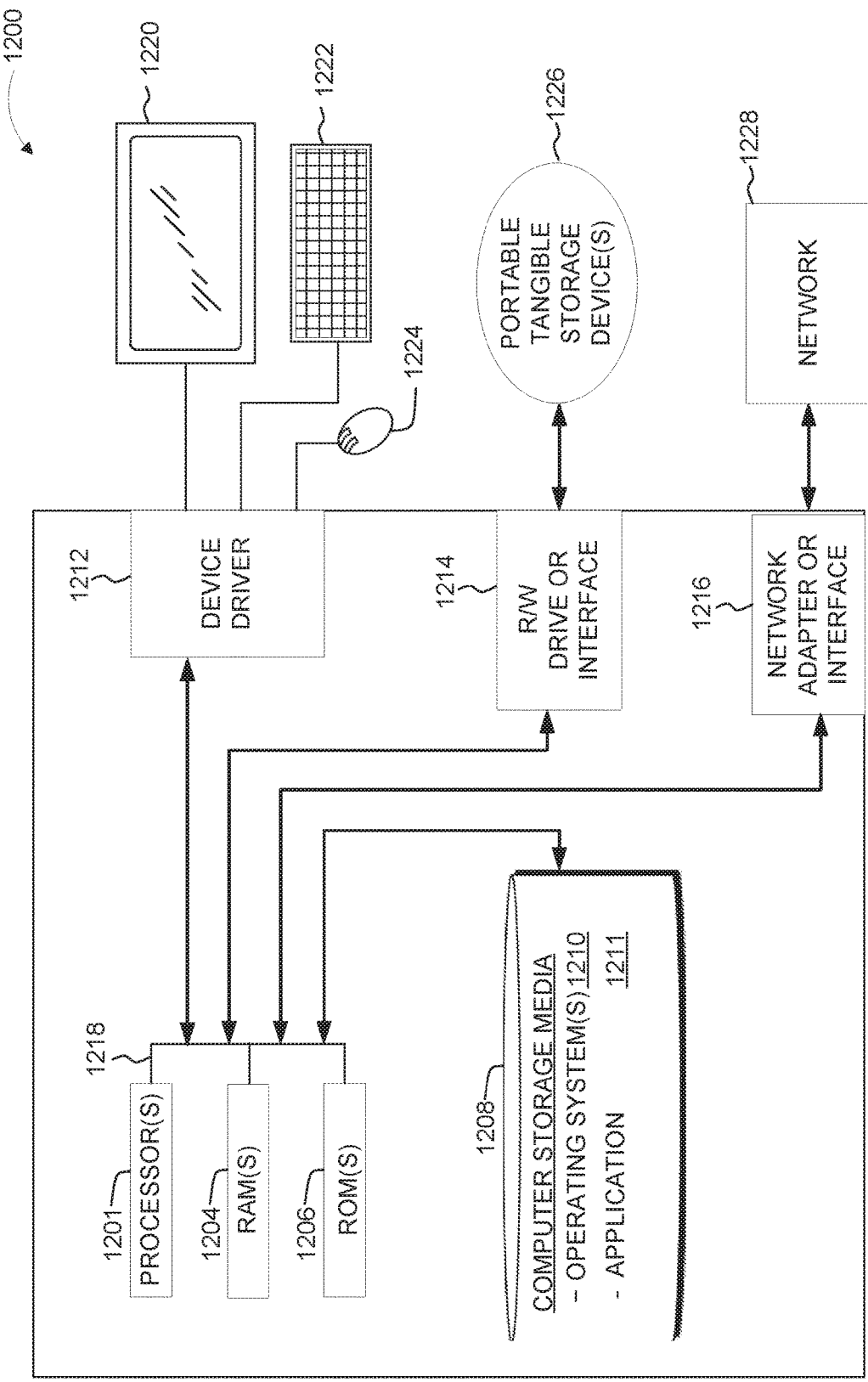
FIG. 12 depicts a block diagram of components of the server computer executing the application, in accordance with an embodiment of the present invention.

FIG. 12 depicts a block diagram of components of a computing device, designated generally as computing device 1200, capable of processing, for example, via cores 100, and receiving various communications, for example, temperature data from a thermal sensor, in accordance with an embodiment of the present invention. It should be appreciated that FIG. 12 provides only an illustration of one implementation and does not imply any limitations with regard to the environments in which different embodiments may be implemented. Many modifications to the depicted environment may be made.

Computing device 1200 may include one or more processors 1201, one or more computer-readable RAMs 1204, one or more computer-readable ROMs 1206, one or more computer readable storage media 1208, device drivers 1212, read/write drive or interface 1214, network adapter or interface 1216, all interconnected over a communications fabric 1218. Communications fabric 1218 may be implemented with any architecture designed for passing data and/or control information between processors (such as microprocessors, communications and network processors, etc.), system memory, peripheral devices, and any other hardware components within a system.

One or more operating systems 1210, and one or more application programs 1211, are stored on one or more of the computer readable storage media 1208 for execution by one or more of the processors 1201 via one or more of the respective RAMs 1204 (which typically include cache memory). In the illustrated embodiment, each of the computer readable storage media 1208 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 1200 may also include a R/W drive or interface 1214 to read from and write to one or more portable computer readable storage media 1226. Application programs 1211 on computing device 1200 may be stored on one or more of the portable computer readable storage media 1226, read via the respective R/W drive or interface 1214 and loaded into the respective computer readable storage media 1208.

Computing device 1200 may also include a network adapter or interface 1216, such as a TCP/IP adapter card or wireless communication adapter (such as a 4G wireless communication adapter using OFDMA technology) for connection to a network 1228. Application programs 1211 on computing device 1200 may be downloaded to the computing device from an external computer or external storage device via a network (for example, the Internet, a local area network or other wide area network or wireless network) and network adapter or interface 1216. From the network adapter or interface 1216, the programs may be loaded onto computer readable storage media 1208. The network may comprise copper wires, optical fibers, wireless transmission, routers, firewalls, switches, gateway computers and/or edge servers.

Computing device 1200 may also include a display screen 1220, a keyboard or keypad 1222, and a computer mouse or touchpad 1224. Device drivers 1212 interface to display screen 1220 for imaging, to keyboard or keypad 1222, to computer mouse or touchpad 1224, and/or to display screen 1220 for pressure sensing of alphanumeric character entry and user selections. The device drivers 1212, R/W drive or interface 1214 and network adapter or interface 1216 may comprise hardware and software (stored on computer readable storage media 1208 and/or ROM 1206).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for processing a thread of execution on a plurality of independent processing cores in a die area, the method comprising:
assigning to each of at least part of the plurality of independent processing cores a run state and a local maximum thermal power, the run state being selected from a group of run states comprising an active state, a warmup state, and a cooling state,
wherein the active state comprising, for a given core of the plurality of independent processing cores, an operational parameter of the given core being set to an overclocked state such that a power dissipation of the given core under workload is expected to exceed a nominal thermal limit of the given core, wherein the nominal thermal limit of the given core are the largest amount of heat power which a cooling system of a processor hosting the given core is able to dissipate continuously from a fraction of the die area covered by the given core without exceeding a maximum temperature at which the given core can be operated without overheat damage,
wherein the cooling state comprising, for the given core, the operational parameter of the given core being set such that the power dissipation of the given core stays below the local maximum thermal power of the given core, wherein the given core in the cooling state includes setting the clock frequency to the lowest value of its nominal range for the given core and a voltage to half of its nominal value for the give core;

setting a first core of the plurality of independent processing cores to the active state;

processing the thread on the first core in the active state;

monitoring the processing of the thread on the first core for fulfilment of an interrupt condition, wherein the interrupt condition is when thermal temperature of the first core exceeds a thermal threshold for the overclocked state of the first core, wherein the thermal threshold is greater than the nominal thermal limit of the first core;

setting a second core of the plurality of independent processing cores to the warmup state, wherein the warmup state comprising caching a shared copy of a non-exclusive cache line from a core-specific cache of the first core into a core-specific cache of the second core; and in response to the interrupt condition being fulfilled:
setting the second core of the plurality of independent processing cores to the active state;
halting the processing of the thread on the first core by ceasing to continue processing a next instruction;
transferring the processing of the thread to the second core;
continuing the processing of the thread on the second core in the active state, and
setting the first core to the cooling state.

2. The computer-implemented method of claim 1, at least part of the plurality of independent processing cores further comprising a core-specific cache, withdrawing the shared copy from the core-specific cache of the given core in case the first core requires the non-exclusive cache line to be exclusive, the method further comprising:
monitoring the processing of the thread on the first core for fulfilment of a warmup condition; and
in case the warmup condition is fulfilled, setting the second core to the warmup state.

3. The computer-implemented method of claim 2, the warmup condition being based on one or more of:
a timer value;
a core-specific temperature figure; and
a core-specific power figure.

4. The computer-implemented method of claim 2, further comprising selecting the second core based on one or more of:
a counting pattern;
a core-specific temperature figure;
a core-specific performance figure;
a local cooling power figure;
the run state; and
a timer value.

5. The computer-implemented method of claim 4, the counting pattern being based on a rule providing the second core at a non-nearest neighbor position.

6. The computer-implemented method of claim 2, the plurality of independent processing cores being incorporated with a plurality of thermally separated units, the selection being based on a unit-switching rule providing the second core in one of the plurality of thermally separated units which differs from the unit incorporating the first core.

7. The computer-implemented method of claim 6, the unit-switching rule being based on:

a number of the plurality of independent cores in the same thermally separated unit as the first core having finished processing the thread in the active state;
a timer value;
a temperature figure of one of the units; and
a figure of heat energy generated in one of the units.

8. The computer-implemented method of claim 2, further comprising receiving core-specific status information for at least part of the plurality of independent processing cores, the interrupt condition, the warmup condition, the selection of the second core, and the unit-switching rule being based on the received core-specific status information.

9. The computer-implemented method of claim 2, further comprising predicting core-specific status information for at least part of the plurality of independent processing cores, the interrupt condition, the warmup condition, the selection of the second core, and the unit-switching rule being based on the predicted core-specific status information.

10. The computer-implemented method of claim 1, the cooling state further comprising, for a given core of the plurality of independent processing cores, preventing the given core from processing.

11. The computer-implemented method of claim 1, further comprising keeping all cores of the plurality of independent processing cores in the cooling state which are not appointed the first core or the second core.

12. The computer-implemented method of claim 1, wherein a given core of the plurality of independent processing cores, after processing the thread in the active state, remains in the cooling state until a restore condition is fulfilled, the restore condition being based on one or more of:
a timer value;
a core-specific temperature figure; and
a number of the cores having finished processing the thread.

13. A computer system for processing a thread of execution on a plurality of independent processing cores in a die area, the computer system comprising:
one or more processors;
one or more computer-readable storage media;
program instructions stored on the computer-readable storage media for execution by at least one of the one or more processors, the program instructions comprising:
instructions to assigning to each of at least part of the plurality of independent processing cores a run state and a local maximum thermal power, the run state being selected from a group of run states comprising an active state, a warmup state, and a cooling state,
wherein the active state comprising, for a given core of the plurality of independent processing cores, an operational parameter of the given core being set to an overclocked state such that a power dissipation of the given core under workload is expected to exceed a nominal thermal limit of the given core, wherein the nominal thermal limit of the given core are the largest amount of heat power which a cooling system of a processor hosting the given core is able to dissipate continuously from a fraction of the die area covered by the given core without exceeding a maximum temperature at which the given core can be operated without overheat damage,
wherein the cooling state comprising, for the given core, the operational parameter of the given core being set such that the power dissipation of the given core stays below the local maximum thermal power of the given core, wherein the given core in the cooling state includes setting the clock frequency to the lowest value of its nominal range for the given core and a voltage to half of its nominal value for the give core;
instructions to set a first core of the plurality of independent processing cores to the active state;
instructions to process the thread on the core in the active state;
instructions to monitor the processing of the thread on the first core for fulfilment of an interrupt condition, wherein the interrupt condition is when thermal temperature of the first core exceeds a thermal threshold for the overclocked state of the first core, wherein the thermal threshold is greater than the nominal thermal limit of the first core;
instruction to set a second core of the plurality of independent processing cores to the warmup state, wherein the warmup state comprising caching a shared copy of a non-exclusive cache line from a core-specific cache of the first core into a core-specific cache of the second core; and
in response to the interrupt condition being fulfilled:
  instructions to set the second core of the plurality of independent processing cores to the active state;
  instructions to halt the processing of the thread on the first core by ceasing to continue processing a next instruction;
  instructions to transfer the processing of the thread to the second core;
  instructions to continue the processing of the thread on the second core in the active state, and
  instructions to set the first core to the cooling state.

14. The computer system of claim 13, further comprising: instructions to measure a physical status of the first core; instructions to monitor the processing of the thread on the first core for fulfilment of the interrupt condition being adapted for receiving from the measuring the physical status of the first core a physical status information descriptive of the physical status of the first core; and instructions to determine the fulfilment of the interrupt condition based on the physical status information received.

15. The computer system of claim 13, further comprising instructions to measuring a physical status of a candidate core from the plurality of independent processing cores, and instructions to selecting the second core from the plurality of cores, the instructions to selecting the second core being adapted for receiving from the instructions to measuring the physical status of the candidate core a physical status information descriptive of the physical status of the candidate core, and for selecting the candidate core as the second core based on the physical status information received.

16. The computer system of claim 15, at least one or more processors further comprising a core-specific cache withdrawing the shared copy from the core-specific cache of the given core in case the first core requires the non-exclusive cache line to be exclusive, the computer system further comprising means for measuring, a physical status of the first core, and instructions to setting the second core to the warmup state in case the measured physical status fulfils a warmup condition.

17. The computer system of claim 13, the plurality of independent processing cores having an identical microarchitecture.

18. A computer program product for processing a thread of execution on a plurality of independent processing cores in a die area, the computer program product comprising:
  one or more computer-readable storage media and program instructions stored on the one or more computer-readable storage media, the program instructions comprising:
  instructions to assigning to each of at least part of the plurality of independent processing cores a run state and a local maximum thermal power, the run state being selected from a group of run states comprising an active state, a warmup state, and a cooling state,
  wherein the active state comprising, for a given core of the plurality of independent processing cores, an operational parameter of the given core being set to an overclocked state such that a power dissipation of the given core under workload is expected to exceed a nominal thermal limit of the given core, wherein the nominal thermal limit of the given core are the largest amount of heat power which a cooling system of a processor hosting the given core is able to dissipate continuously from a fraction of the die area covered by the given core without exceeding a maximum temperature at which the given core can be operated without overheat damage,
  wherein the cooling state comprising, for the given core, the operational parameter of the given core being set such that the power dissipation of the given core stays below the local maximum thermal power of the given core, wherein the given core in the cooling state includes setting the clock frequency to the lowest value of its nominal range for the given core and a voltage to half of its nominal value for the give core;
  instructions to set a first one of the cores to the active state;
  instructions to process the thread on the first core in the active state;
  instructions to monitor the processing of the thread on the first core for fulfilment of an interrupt condition, wherein the interrupt condition is when thermal temperature of the first core exceeds a thermal threshold for the overclocked state of the first core, wherein the thermal threshold is greater than the nominal thermal limit of the first core;
  instruction to set a second core of the plurality of independent processing cores to the warmup state, wherein the warmup state comprising caching a shared copy of a non-exclusive cache line from a core-specific cache of the first core into a core-specific cache of the second core; and
  in response to the interrupt condition being fulfilled:
    instructions to set the second one of the cores to the active state;
    instructions to halt the processing of the thread on the first core by ceasing to continue processing a next instruction;
    instructions to transfer the processing of the thread to the second core;
    instructions to continue the processing of the thread on the second core in the active state, and
    instructions to set the first core to the cooling state.

* * * * *